United States Patent [19] Brown et al.

[11] 3,898,631

[45] Aug. 5, 1975

[54] STORAGE INDICATOR

[75] Inventors: Eugene Clifford Brown; Gary Robert Heinberg, both of Poughkeepsie; Arthur Leroy Henry, Wappingers Falls; Robert Edward Mahoney, Poughkeepsie; Robert Mark Unterberger, Hopewell Junction; Thomas Richard Wright, Shokan, all of N.Y.

[73] Assignee: IBM Corporation, Armonk, N.Y.

[22] Filed: Dec. 13, 1973

[21] Appl. No.: 424,384

[52] U.S. Cl.... 340/173 R; 317/101 DH; 340/172.5; 340/174 R

[51] Int. Cl.$^{2}$..................... G11C 5/02; G11C 29/00

[58] Field of Search......... 340/173 R, 172.5, 174 R; 317/99, 101 R, 101 CM, 101 CE, 101 D, 101 DH

[56] References Cited

UNITED STATES PATENTS

| | | | |
|---|---|---|---|
| 3,191,095 | 6/1965 | Hefti | 317/101 DH |
| 3,691,399 | 9/1972 | Vinch et al. | 317/101 DH |

OTHER PUBLICATIONS

Kearley et al., Open-Circuit Detector, IBM Technical Disclosure Bulletin, Vol. 16, No. 3, 8/73, pp. 732-733.

*Primary Examiner*—Stuart N. Hecker
*Attorney, Agent, or Firm*—James E. Murray

[57] ABSTRACT

This specification describes an apparatus to sense and digitally indicate the number of bytes of storage contained in a memory unit.

3 Claims, 3 Drawing Figures

PATENTED AUG 5 1975 3,898,631

SHEET 1

| NO OF MEGABYTES | 0 | 1 | 2 | 3 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |

+ = 1 − = 0

STORAGE INDICATOR

BACKGROUND OF THE INVENTION

The present invention relates to memory units and more particularly to memory units in which the amount of storage can be changed.

In modern data processing systems memory units can be provided with varying amounts of storage. For instance, a memory unit could be built which would contain from one megabyte to eight megabytes of storage in segments of one megabyte each. Such a memory unit would have a plug board in which array cards containing up to a total of eight megabytes of storage are plugged. If the customer desired a data processing system with one megabyte of storage, array cards with a total of one megabyte of storage thereon would be plugged into the board. If more storage was needed later additional segments of storage could be added by plugging more array cards into the plug board.

So that the data processing system may properly allocate the amount of storage it has available it has been the practice to provide some indication to the processing unit how much pluggable storage is contained in the memory unit. This is generally done by having a terminal board containing electrical terminals that can be jumpered or wired in different ways to give an indication as to the amount of storage in the memory unit. However, errors occur in the use of such a scheme. The serviceman adding the memory unit may wire the terminal board improperly indicating to the data processing system that there is more or less storage in the memory unit than is actually present. Furthermore, in plugging the cards the serviceman may plug array cards in the wrong position in the array plug board. For instance, suppose two megabytes of memory are to be provided and the serviceman plugs the first megabyte properly but plugs the second megabyte into a position on the array plug board that is reserved for the fourth megabyte. In such a case the system would receive an indication from the way the terminal board is wired that it has two megabytes of storage available. However, when the system addresses the second megabyte it would only find empty terminals. At the same time the array cards plugged in the fourth megabyte position would go unused.

SUMMARY OF THE INVENTION

To overcome the problems associated with previous means of indicating the amount of storage available, applicants have provided a structure that automatically provides an indication to the data processing system as to the amount of storage available. This system includes circuitry, which responds to the insertion of each segment of pluggable storage into the array board by providing a binary signal indicating the number of segments plugged into the board. After the array cards have been plugged in, the serviceman can check this binary signal to see if he has properly plugged in the array cards. Thus, if he had plugged in two megatybes of memory and the binary signal indicated four megabytes were available he would know he had plugged the array cards in the wrong position.

It is an object of the present invention to provide an automatic indication of the amount of storage available in a memory unit.

It is another object of the present invention to provide an indication as to whether storage array cards are properly plugged into a memory unit.

The foregoing and other objects, features and advantages of the present invention will be apparent from the following description of a preferred emodiment of the invention as illustrated in the accompanying drawings of which:

DESCRIPTIONS OF THE DRAWINGS

DETAILED DESCRIPTION

Figure 1:
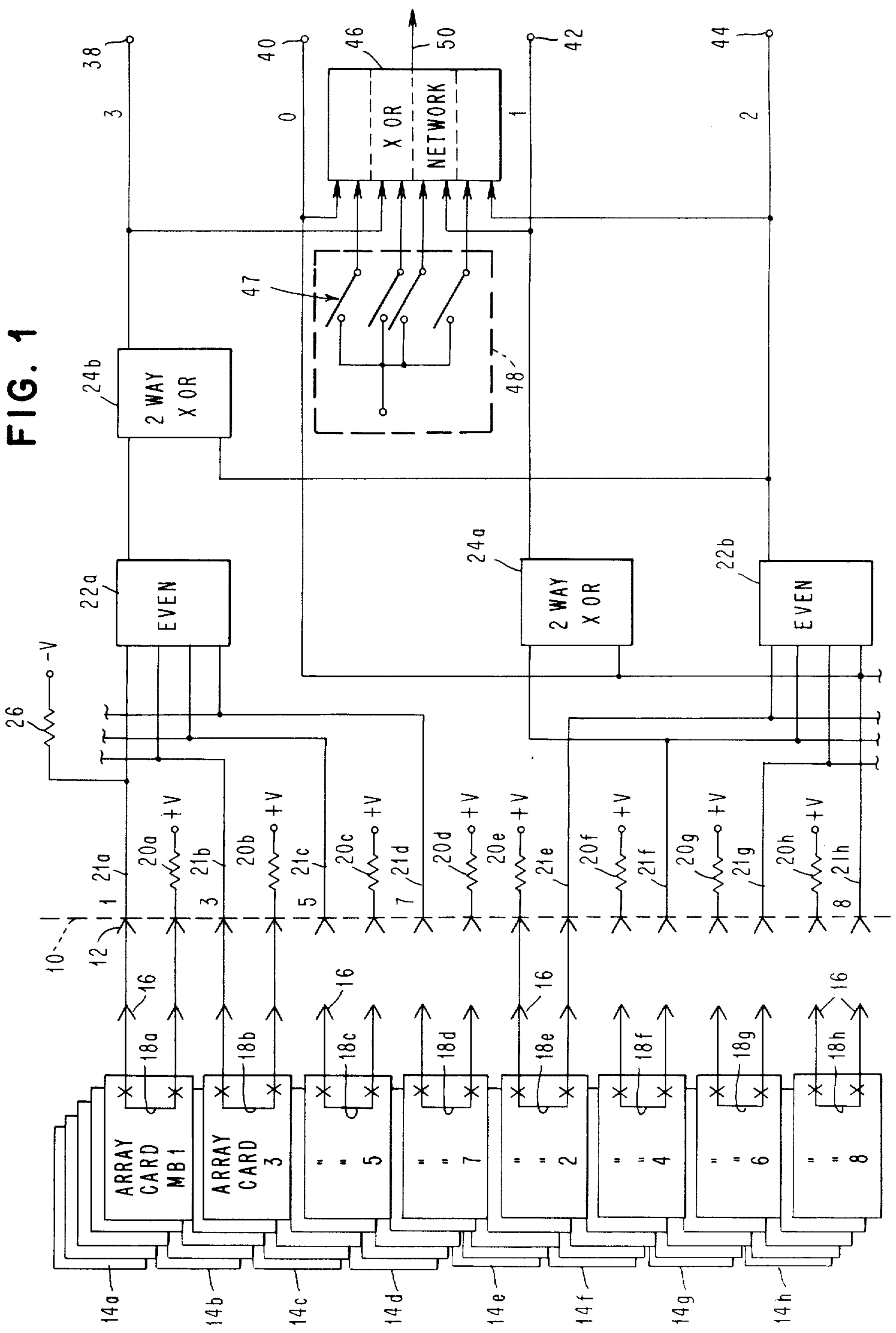
FIG. 1 is an electrical schematic of the present invention.

Referring now to FIG. 1, the plug board 10 contains a number of receptacles 12 to receive array cards 14 containing the storage bits for the memory. These storage bits are arranged in megabyte segments with each megabyte mounted on a number of pluggable array cards 14. Each of the array cards 14 contains connectors 16 that match with the receptacles 12. On each card two of these connectors 16 are shorted together by a jumper 18. In each megabyte two of the connectors 16 on one of the cards plug into receptacles 12 that connect one end of the jumper 18 to a +V source through a resistor 20 and the other end of the jumper to an input 21 of a logic circuit. The function of this logic circuit is to provide an indication as to the number of its inputs 21 that are shorted to a +V volt source by jumpers 18. When not so shorted the inputs are each maintained at a negative voltage by a negative source −V connected to the input by resistor 26.

The logic circuit includes two even circuits 22 and two Exclusive OR circuits 24.

Figures 2, 3:
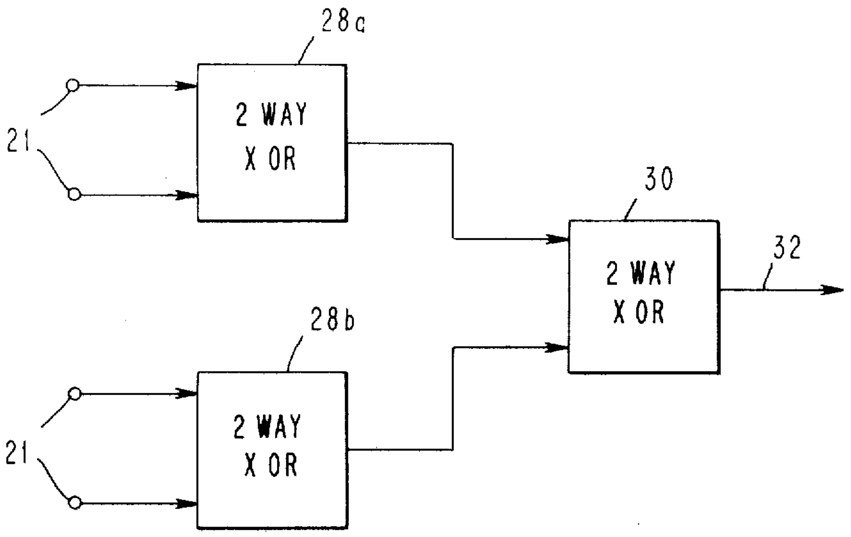
FIG. 2 is a logic diagram for even circuits shown in FIG. 1.
FIG. 3 is a chart showing the possible outputs for the schematic in FIG. 1.

Referring to FIG. 2 we can see how an even circuit 22 works. It includes two input Exclusive OR gates 28 each receiving two inputs 21. The outputs of these two input Exclusive OR gates 28 are fed into an output Exclusive OR gate 30. Thus when 1 or 3 of the inputs 21 are positive the output 32 of the even circuit is positive. However if 2, 4 or none of the inputs are positive the output 32 of the even circuit is negative.

Now let us go back to FIG. 1 and show how the logic circuit operates. Let us first assume that the array cards **14*a* for the first megabyte of memory have been installed. This supplys a positive signal to one input 21*a* of the even circuit 22*a* and negative signals to all the other inputs of that even circuit 22*a* and to all the inputs to even circuits 22*b*, *c* and Exclusive OR circuit 24*a*. As a result a positive output is obtained from the even block 22a and negative outputs are gotten from even block 22b and Exclusive OR circuit 24*a*. This makes the output of Exclusive OR circuit 24*b* positive so that a 3 bit terminal 38 would be positive and 0, 1 and 2 bit terminals 40, 42 and 44 would all be negative providing a binary 1 output from the logic circuit to indicate that one megabyte of memory has been plugged into the board 10**.

Now assume that cards 14 for three megabytes of memory have been properly plugged into board 10. It can be seen there would be two positive and two negative input signals to block **22*a* providing a negative output from block 22*a***. While there would be two negative signals at the input to Exclusive OR circuit 24*a* providing a negative output at terminal 42. Even block 22*b* would receive one positive input from array card 14*e* providing a positive output from that block. As a result, the output of Exclusive OR 24*b* would be positive. Therefore, there would be positive outputs at the 2 and 3 bit terminals and a negative output at the other terminals so that the binary signal for number 3 would appear at the output terminals 38 to 44.

Finally, assume that two megabytes of memory have been inserted into the board 10 but the array cards 14e for the second megabyte were plugged in the position reserved for array cards of the third megabyte. Then even blocks 22*a* and 22*b* would provide positive outputs while Exclusive OR circuit 24*a* would provide a negative output resulting in all the bit terminals 38 to 44 being negative thereby indicating to the data processing system that there was no storage available. However, two megabytes of storage had actually been installed. If the outputs at the terminals 38 to 44 were checked after installation, the serviceman would note the discrepancy and check the array cards to see if they were properly installed. The outputs 38 to 44 could be checked in any of a number of ways. One way would be to scope the outputs. Another way would be automatically check them through an Exclusive OR network 46 which would receive one input on each Exclusive OR from each of the outputs 38 to 44 and the second input for each Exclusive OR from a box 48 providing the proper binary signal for the number of megabytes being installed. If the outputs at terminals 38 to 44 do not match with the inputs provided from the box 48 the Exclusive OR network 46 would provide an error signal on line 50.

While the invention has been particularly shown and described with reference to a preferred embodiment thereof, it will be understood by those skilled in the art that the above and other changes in form and details may be made therein without departing from the spirit and scope of the invention.

What is claimed is:

1. In a memory in which the amount of storage can be changed in segments by the addition or removal of memory array cards from an interface, apparatus for indicating the amount of storage available in the memory unit, comprising;

circuit means associated with each segment of array cards for providing an indication to the interface that the array cards of that segment are present at the interface;

detection means at a number of locations in the interface for the generation of a separate signal for the presence of array cards at each of those locations, and logic circuit means for receiving all of the detection signals from the different detection means and providing a binary output indicative of the number of bits of storage present at the interface.

2. The apparatus of claim 1 including comparison means for comparing the output of the logic circuit means with the amount of segments actually installed to give an indication of whether or not the array cards were installed properly.

3. The structure of claim 2 in which said interface is a plug board with receptacles;

said array cards contain connectors to be inserted in the receptacle;

said circuit means is a connection between two of said connector means; and said detection means is a voltage source which is connected to an input to the logic means by said connector when the array cards are inserted into the receptacle.

* * * * *